United States Patent
Liu et al.

(10) Patent No.: US 10,855,849 B1
(45) Date of Patent: Dec. 1, 2020

(54) ANALYSIS OF DATA METRICS IN IPBX NETWORKS

(71) Applicant: 8x8, Inc., San Jose, CA (US)

(72) Inventors: Zhishen Liu, San Jose, CA (US); Qing Zhao, San Jose, CA (US); Bryan R. Martin, San Jose, CA (US)

(73) Assignee: 8x8, Inc., Campbell, CA (US)

( * ) Notice: Subject to any disclaimer, the term of this patent is extended or adjusted under 35 U.S.C. 154(b) by 393 days.

(21) Appl. No.: 14/725,944

(22) Filed: May 29, 2015

(51) Int. Cl.
*H04M 7/00* (2006.01)
*H04M 3/22* (2006.01)

(52) U.S. Cl.
CPC ....... *H04M 7/0084* (2013.01); *H04M 3/2218* (2013.01); *H04M 7/009* (2013.01)

(58) Field of Classification Search
None
See application file for complete search history.

(56) References Cited

U.S. PATENT DOCUMENTS

| | | | |
|---|---|---|---|
| 6,782,080 B2 | 8/2004 | Leivo et al. | |
| 7,212,516 B1 * | 5/2007 | O'Sullivan | H04M 3/5237 370/352 |
| 7,647,041 B2 | 1/2010 | Gonsalves et al. | |
| 8,300,634 B2 | 10/2012 | Narayanaswamy | |
| 2002/0115447 A1 * | 8/2002 | Martin | G06Q 20/202 455/456.3 |
| 2005/0008137 A1 * | 1/2005 | Naito | H04M 3/546 379/211.02 |
| 2008/0118041 A1 | 5/2008 | Finogenov | |
| 2009/0221265 A1 | 9/2009 | Liu et al. | |
| 2010/0197288 A1 | 8/2010 | Camilleri et al. | |
| 2011/0299673 A1 * | 12/2011 | Mello | H04L 12/14 379/114.01 |

(Continued)

FOREIGN PATENT DOCUMENTS

WO 2008089522 A1 7/2008

OTHER PUBLICATIONS

Gerry Blackwell, "Jajah: Free VoIP with a Twist," www.voipplanet.com (Oct. 5, 2006).

(Continued)

*Primary Examiner* — Jeffrey M Rutkowski
*Assistant Examiner* — Mehedi S Aley
(74) *Attorney, Agent, or Firm* — Crawford Maunu PLLC

(57) ABSTRACT

Apparatuses and methods concerning routing of calls in an IPBX server are disclosed. As an example, one apparatus includes a first processing circuit communicatively coupled to an IPBX server. The IPBX server is configured to generate call event messages for the VoIP calls routed by the IPBX server. The first processing circuit is configured to generate call summary metrics from the call event messages. The call summary metrics indicate respective sets of call data for participants of the calls routed by the IPBX server. A second processing circuit is configured to identify organizations associated with the participants of the calls. The second processing circuit aggregates call summary metrics of the participants associated with at least one identified organization and identifies, based on the aggregated call summary metrics, needs of the organization that can be satisfied by a set of capabilities of an entity.

20 Claims, 5 Drawing Sheets

(56) References Cited

U.S. PATENT DOCUMENTS

| | | | | |
|---|---|---|---|---|
| 2012/0020472 | A1* | 1/2012 | Cutajar | H04M 3/5234 |
| | | | | 379/265.02 |
| 2014/0164162 | A1* | 6/2014 | Rabenold | G06Q 30/08 |
| | | | | 705/26.3 |
| 2014/0343957 | A1* | 11/2014 | Dejori | G16H 50/70 |
| | | | | 705/2 |
| 2015/0036485 | A1* | 2/2015 | Poulson | H04L 41/0668 |
| | | | | 370/228 |
| 2015/0046286 | A1* | 2/2015 | Erb | G06Q 30/0623 |
| | | | | 705/26.61 |
| 2017/0324750 | A1* | 11/2017 | Khan | H04L 63/123 |

OTHER PUBLICATIONS

Jeff Goldman, "TalkPlus: a PBX for Mobil Phones," www.voipplanet.com (Aug. 16, 2007).

* cited by examiner

ANALYSIS OF DATA METRICS IN IPBX NETWORKS

OVERVIEW

A private branch exchange (PBX) routes calls between a service provider network (e.g., a cellular network or a public standard telephone network (PSTN) and a plurality of end-users having respective telephone extensions in a private telecommunication network. One type of PBX, known as an Internet Protocol PBX (IPBX), routes calls between a service provider network and a plurality of Voice over Internet Protocol (VoIP)-enabled circuit devices on an IP network using VoIP, in which each device is assigned a respective telephone extension.

SUMMARY

Apparatuses and methods concerning routing of calls in an IPBX server are disclosed. As an example, one apparatus includes a first processing circuit communicatively coupled to an IPBX server. The IPBX is configured to route VoIP calls for a plurality of end-users having respective VoIP-enabled circuit devices communicatively coupled to the IPBX server via a communications network. The IPBX generates call event messages indicating changes in statuses of the routed VoIP calls. The first processing circuit is configured to generate call summary metrics from the call event messages. The call summary metrics indicate respective sets of call data for participants of the calls routed by the IPBX server. A second processing circuit is configured to identify organizations associated with the participants of the calls. The second processing circuit is further configured to, for at least one of the identified organizations, aggregate call summary metrics of the participants associated with the organization to produce an aggregate set of data. In various implementations, the second processing circuit may aggregate call summary metrics for calls occurring over various time periods including, for example, second, minutes, hours, days, weeks, months, or years. The second processing circuit identifies, based on the aggregate set of data, needs of the organization that can be satisfied by a set of capabilities of an entity. The second processing circuit also provides an indication of the at least one organization and the set of needs to the entity.

A method is also disclosed for analyzing call data. Using an IPBX server, VoIP calls are routed for a plurality of end-users having respective VoIP-enabled circuit devices communicatively coupled to the IPBX server via a communications network. Call event messages, indicating changes in statuses of the routed VoIP calls, are provided to a call data processing circuit communicatively coupled to the IPBX server. Using a first processing circuit, call summary metrics are generated for the calls routed by the IPBX server based on the call event messages. The call summary metrics indicate respective sets of call data for participants of the calls routed by the IPBX server. Using a second processing circuit communicatively coupled to the first processing circuit, organizations associated with the participants of the calls are identified. For at least one of the identified organizations, call summary metrics of the participants associated with the organization are aggregated to produce a respective aggregate set of data. Based on the aggregate set of data, a set of needs of the organization that can be satisfied by a set of capabilities of an entity is identified. An indication of the at least one organization and the set of needs is provided to the entity.

BRIEF DESCRIPTION OF THE FIGURES

The disclosure may be more completely understood in consideration of the following detailed description of various embodiments of the disclosure, in connection with the accompanying drawings in which.

Figure 1:
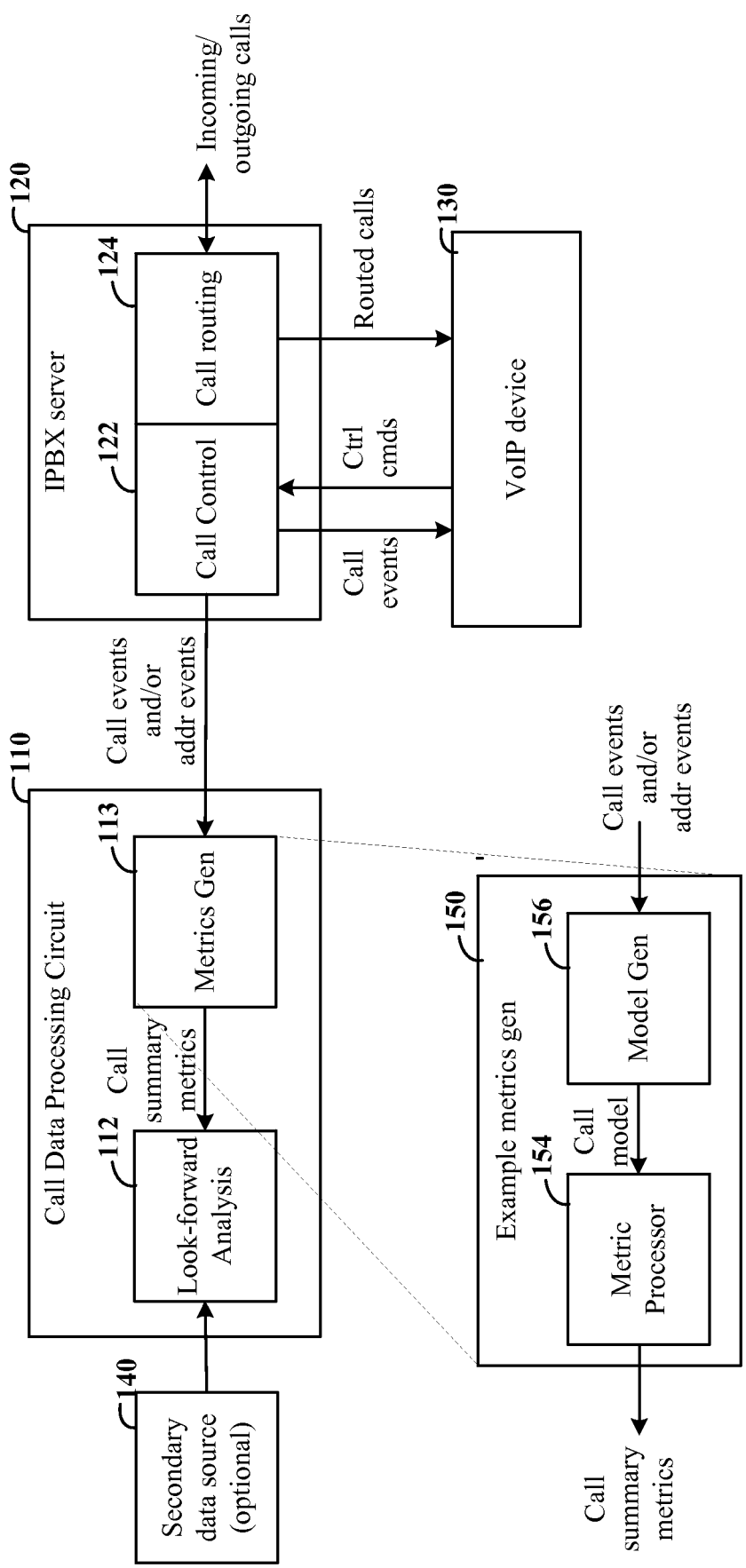
FIG. 1 shows an example communication system having an IPBX server and a call data processing circuit configured in accordance with one or more embodiments of the present disclosure.

While various embodiments are amenable to various modifications and alternative forms, specifics thereof have been shown by way of example in the drawings and will be described in detail. It should be understood, however, that the intention is not to limit the disclosure to the particular examples and embodiments described. On the contrary, the intention is to cover all modifications, equivalents, and alternatives falling within the spirit and scope of the disclosure.

DETAILED DESCRIPTION

Aspects of the present disclosure are believed to be applicable to a variety of different types of apparatuses, systems and methods utilizing an IPBX server to route calls for a plurality of end-users in a communication network. In some implementations, the IPBX server generates call event messages to indicate changes in statuses of calls to call participants. Call event messages may include for example, ring/alert, call connected, call disconnected, call on-hold, call parked, call reconnected, call transferred, and/or calls merged/conferenced. The call event messages may be provided to various end-users and/or applications in addition to end-users who are participants in a call. For example, a switchboard application may be configured to display status of calls on the network to receptionists to allow call receptionists to better direct calls. While the disclosed embodiments are not necessarily limited to such applications, various aspects of the present disclosure may be appreciated through a discussion of various examples using this context.

In one or more embodiments, an apparatus includes a first processing circuit configured to generate call summary metrics for calls routed by an IPBX based on the call event messages received from the IPBX. The call summary metrics indicate respective sets of call data for participants of the calls routed by the IPBX server. For example, the call summary metrics may indicate for each of the call participants: a number incoming calls, a number of outgoing calls, a number of answered calls, a number of missed calls, a number of abandoned calls, average call time, average time to answer, average on-hold time, or various combinations thereof. In some embodiments, the first processing circuit may also generate data metrics characterizing other data parameters (e.g., address events for devices, statuses/presence of end-users, and/or use of network application) that are monitored in an IPBX network or received from secondary data sources. Secondary data sources may include, for example, applications utilized by the end-users associated with the organization, internet-connected data repositories, and/or third-party data subscription services.

The apparatus also includes a second processing circuit that is configured to identify organizations associated with the participants of the calls. An organization may include, for example, a company, department, group, or individual end-user. An organization associated with a call participant may be determined for example by cross-correlate call summary metrics for a call with secondary data sources including, for example, an IPBX directory, contract directories of individual end-users in an IPBX, internet-connected data repositories, and/or third-party data subscription service. For at least one of the identified organizations, the second processing circuit aggregates call summary metrics and/or other data metrics of the participants associated with the organization to produce an aggregate set of data. The second processing circuit analyzes the aggregate set of data to identify needs of the organization that can be satisfied by a set of capabilities of an entity. The second processing circuit also provides a data set, indicating the at least one organization and the set of needs, to the entity. The entity may be, for example, one or more of the identified organizations, or a VoIP service provider configured to host IPBXs for one or more of the organizations.

The set of capabilities may include, for example, features of a set of available products and/or services. Products and/or services may be provided by for example, by an identified organization or by a VoIP service provider configured to host IPBXs for one or more of the organizations. In some implementations, the set of capabilities may include features defined for a product in development (e.g., using a feature-driven-development workflow).

In some implementations, the capabilities in the set may be manually defined by an authorized user (e.g., via a graphical user interface). For instance, a sales manager may manually add new product features to the set of capabilities. Additionally or alternatively, capabilities in the set may be automatically determined based on the call summary metrics. For instance, the analysis circuit may be configured to determine capabilities for an identified organizations based on the call data metrics for call participants associated with the organization. As an illustrative example, an organization may provide a service with limited bandwidth. The capability of the organization to provide the service for additional customers may be estimated based on a comparison of an average number of recent calls to recorded minimum and maximum numbers of calls processed by the organization. As another example, headers and other data communicated with VoIP packets routed to end-users of an organization may indicate services provided by organization. For instance, VoIP data packets communicated to agents in a call center that include video data may indicate that the call center provides video-based customer service.

In some embodiments, services offered by an organization may be determined by cross referencing call summary metrics for the organization with one or more secondary data sources such as, for example, applications utilized by the end-users associated with the organization, internet-connected data repositories, and/or third-party data subscription services.

Identifying needs of associated organizations may be useful, for example, to identify potential customers for services or processes or to identify potential features for future products or services. For instance, an organization may have a need for security monitoring tools if analysis of call summary metrics indicates occurrence of a high number of fraudulent calls in an IPBX operated by an organization. As another example, the identification of needs may be useful for evaluating quality of service provided to existing customers. For example, unanswered or dropped calls in a virtual call center provided to a customer, may indicate a need to allocate additional call center resources to the customer. As another example, upward trends in use of a bandwidth limited service by an organization may indicate a need for a higher-bandwidth service subscription.

Different embodiments may identify needs of an organization using various processes. In some implementations, needs may be identified based on a comparison of call summary metrics to a respective signature for the need. The signature may identify presence or absence of a need as a function of values of one of more call summary metrics, which alone or in combination are indicative of the need. For example, a large number of unanswered inbound calls may indicate a need for a call attendant service (e.g., an automated call menu, or a virtual call center). As another example, a large number of outbound calls to a technical support line may indicate a need for a replacement product or service. As yet another example, a large number of conference calls described in the call summary metrics for an organization may indicate a need for need for virtual meeting services. In some implementations, a signature for a need may identify a need based on a comparison of call summary metric values to fixed threshold values that are indicative of the need. In some other implementations, a signature for a need may identify a need based on trends of values of call summary metrics in comparison to a historical average values.

In some implementations, a signature may identify a need based on various additional data metrics in addition to, or in lieu of, the call summary metrics. For instance, additional data metrics may be gathered from various data sources including, for example, applications utilized by the end-users in the network, internet-connected data repositories, and/or third-party data subscription services. For ease of explanation, examples may be primarily discussed with reference to determination of needs based on analysis of call summary metrics.

For ease of explanation, the examples are also primarily described with reference to an IPBX server. However, the embodiments are not so limited. Rather, some disclosed aspects may be applicable to methods, systems, and apparatuses that provide various types of communication channels including for example, voice calls, voicemail, short-message-service (SMS) messaging, instant messaging, memos, and/or email.

Turning now to the figures, FIG. 1 shows an example communication system having an IPBX server configured in accordance with one or more embodiments. The IPBX server 120 includes a call routing circuit 124 configured to route VoIP calls for VoIP-enabled devices (e.g., 130) communicatively coupled to the IPBX server 120 via a network. Each of the VoIP enabled devices corresponds to a respective end-user or call receptionist in the IPBX.

The IPBX server 120 includes a call control circuit 122 configured to direct routing of calls by the call routing circuit 124, responsive to the VoIP-enabled devices 130. VoIP-enabled devices 130 communicates call control commands to the call control circuit 122 of the IPBX server 120 to prompt the call routing circuit 124 to perform various call-related actions selected by an end-user or receptionist. The call control circuit 122 generates event messages to indicate changes in statuses of the pending calls to VoIP-enabled devices 130 of end-users who are active participants in the call.

As previously indicated, call event messages may be provided to various end-users and/or applications in addition to end-users who are participants in a call. For instance, in some implementations, an authorized user or application may initiate a subscription to monitor call events for specified end-users. In response to receiving a subscription request, the call control circuit 122 initiates a new subscription for the user or application. While the subscription is active, the call control circuit 122 provides event messages to the subscriber to indicate changes in statuses of the calls for the end-users specified in the subscription.

A call data processing circuit 110 is configured to receive the call event messages generated by the IPBX server 120 for calls to or from the end-users. The call data processing circuit 110 includes a metrics generation circuit 113 configured to generate call summary metrics from the call event messages received from the IPBX 120. Circuit 150 shows an example implementation of the metric generator circuit 113. In this example, the circuit 150 includes a model generation circuit 156 configured to generate call models from the call event messages. A call model may include records describing, for example, participants of a call, connections between the participants, and/or events of the call. The example circuit 150 may also include a metric processor circuit 154 configured to generate call summary metrics from the call models. The call summary metrics for a call indicate various statistics characterizing the call and/or end-user participation in the call. For further information regarding generation of call models and call summary metrics, reference may be made to U.S. patent application Ser. No. 14/725,878 filed on May 29, 2015, and entitled "MODELING AND ANALYSIS OF CALLS IN IPBX", which is fully incorporated by reference herein.

In some embodiments, the call data processing circuit 110 may generate additional data metrics characterizing other data parameters (e.g., address events for devices, statuses/presence of end-users, and/or use of network application) that are monitored in an IPBX network or received from secondary data sources. Secondary data sources may include, for example, devices connected in the network, applications utilized by the end-users in the network, internet-connected data repositories and devices, and/or third-party data subscription services.

As an illustrative example, the analysis circuit may be configured to generate data metrics based on address events indicating statuses of extensions, call queues, or agent groups in the IPBX. Address events may include, for example, IN_SERVICE, OUT_OF_SERVICE, CREATED, REMOVED, LINKED, UNLINKED, DND, IDLE, ON_CALL, WrapUP, QUEUE_LOGIN, and/or QUEUE_LOGOUT. For instance, in some implementations, the call data processing circuit 110 initiate a subscription to monitor address events for specified extensions, ring groups, or call queues. While the subscription is active, the call control circuit 122 provides address event messages to the call data processing circuit 110 to indicate address events corresponding to the extensions, ring groups, or call queues specified in the subscription.

Based on the address events, the call data processing circuit 110 may generate various metrics including, for example, time in service, time out of service, or number of queues serviced by an extension. As another example, the call data processing circuit 110 may generate data metrics based on SIP registration events, which report statuses of end-user VoIP devices. Status of user devices may include, for example, time registered, time unregisters, time until expiration of registration, bandwidth of end-user connections. Additionally or alternatively, the call data processing circuit 110 may generate data metrics relating to end user status based on presence detection events (e.g., XMPP presence events) indicative of user end-user activity and/or status in a network. Data metrics related to network performance (e.g., packet loss or throughput) may also be generated based on data received from a network monitor. As another example, data metrics related to sales may be generated based on data received from a telemarketing system.

The call data processing circuit 110 may utilize various processes to generate call summary metrics and/or other data metrics from received data. In some embodiments, the call data processing circuit 110 may implement a processing engine (e.g., KAFKA) to consume various types of events (e.g., call events, address events, and/or status events) and generate data metrics. For example, the call data processing circuit 110 may implement respective KAFKA event stream processes to consume and process different types of events.

The call data processing circuit 110 also includes an analysis circuit 112 configured to perform various analytical processes using the call summary metrics and/or other data metrics. In some embodiments, the analysis circuit 112 is configured to identify organizations associated with call participants and analyze call summary metrics for calls of the organizations to identify needs of the organization. For at least one of the identified organizations, the analysis circuit 112 aggregates call summary metrics and/or other data metrics of the participants associated with the organization to produce an aggregate set of data. Based on the aggregate set of data, the analysis circuit 112 identifies needs of the organization that can be satisfied by a set of capabilities. As previously indicated, the set of capabilities may include, for example, features of a set of available products and/or services offered by various parties (e.g., an identified organization or VoIP service provider configured to host an IPBXs for one or more of the identified organizations). As previously described, capabilities in the set may be manually defined by an authorized user (e.g., a sales manager of an organization) or may be automatically determined by the analysis circuit based on the call summary metrics and/or other data metrics.

In different embodiments, the analysis circuit 112 may use various processes to identify needs of an organization. In some implementations, the analysis circuit 112 identifies a need of an organization based on a comparison of call summary metrics (and/or other data metrics) for the organization to a respective signature for the need. The signature may identify a presence or absence of a need as a function of values of one of more call summary metrics, which alone or in combination are indicative of the need. The analysis circuit 112 may determine whether or not an organization has the need by evaluating the function using the call summary metrics for calls of users associated with the organization. In some implementations, a signature may identify a need as a function of various data metrics in addition to or in lieu of the call summary metrics. For instance, additional data metrics may be gathered from various data sources including, for example, applications utilized by the end-users in the network, internet-connected data repositories, and/or third-party data subscription services.

In some embodiments, the analysis circuit 112 is configured to determine needs and/or capabilities of the identified organizations using a machine learning algorithm (e.g., an evolutionary algorithm). The machine learning algorithm may be evaluated and adjusted in a training processes to improve performance and/or accuracy of algorithm. Training may include supervised learning, which manually assesses performance or selects modifications, or may include unsupervised learning, which automatically assesses performance of different variations of the algorithm. In some implementations, the analysis circuit 112 may be configured to continue to adjust the algorithm during operation. For example, the analysis circuit 112 may be configured to perform requested analytic operations using a current algorithm and also with one of more variations of the algorithm. Data from the current algorithm may be used as the result of the analytical operation. Data from the variations of the algorithm may be compared to the current algorithm to determine is any improvement is achieved. If a variation of the algorithm, outperforms the current algorithm for a threshold number of data sets, the analysis circuit 112 may select the variation to be used as the current algorithm.

In some embodiments, the analysis circuit 112 is configured to perform various analytical processes in lieu of or in addition to the identification of needs for the identified organizations. For example, the analysis circuit 112 may be configured to filter call summary metrics to produce a subset of the call summary metrics indicative of a particular parameter of interest specified in an input query. Data for the parameter of interest may then be generated based on the subset of the call summary metrics. As another example, an input query may request the analysis circuit 112 to identify a set of values of the call summary metrics, which have a strong correlation to a set of calls specified by the input query. After identifying the set of values, the values may be used as a signature to identify similar calls as they occur. This process may be useful, for example, to determine a signature to detect fraudulent calls based on calls previously identified as being fraudulent. Similarly, the input query may specify call summary metrics and/or analytics for customers leading up to new sales contracts. As yet another example parameter of interest, the input query may request to identify call summary metrics that are exhibiting a recent trend in comparison to a historical average value. Trends may be identified, for instance, based on deviation of metric values in a recent time window from an average calculated from the previous time window. In some implementations, the analysis process may further evaluate identified trends to identify other metrics that exhibit a strong correlation with the identified trend.

In some embodiments, the call data processing circuit is configured to correlate call summary metrics with data provided from other secondary data sources 140 to facilitate further analysis. For example, the analysis circuit 112 may be configured to identify subject matter of one or more calls by cross-correlating call summary metrics of the call with scheduling data of call participant (e.g., from a scheduling application). For instance, scheduling data may indicate that a conference call was held to discuss a particular project. In some implementations, the analysis circuit 112 may aggregate call summary data for calls related to a subject specified in an input query. As another example, a presence (or activity) detection circuit may provide data indicating statuses of the end-users to the call data processing circuit. The status data may be communicated to the call data processing circuit using, for example, the Extensible Messaging and Presence Protocol (XMPP). Status of an end-user may be determined based on activity data such as input commands/requests, in network applications (such as a virtual office environment), that are indicative that a user is active on the network. Some examples of activities can include a user checking/sending email by an end-user, use of scheduling application by an end-user, use of a video conferencing application by an end-user, retrieving files from a file server by the end-user, and an active virtual desktop session of the end-user. Status of end-users may provide insight for analyzing call summary metrics and detecting needs or organizations. For instance, numbers of missed (unanswered) calls may be indicative of a need for call center services. However, user status data may indicate that some or all calls were missed because the organization was closed for a holiday. For further information regarding presence detection circuits and methods, reference may be made to U.S. application Ser. No. 14/661,902, titled "IPBX CONTROL INTERFACE FOR DISTRIBUTED NETWORKS", which is fully incorporated by reference herein.

Figure 2:
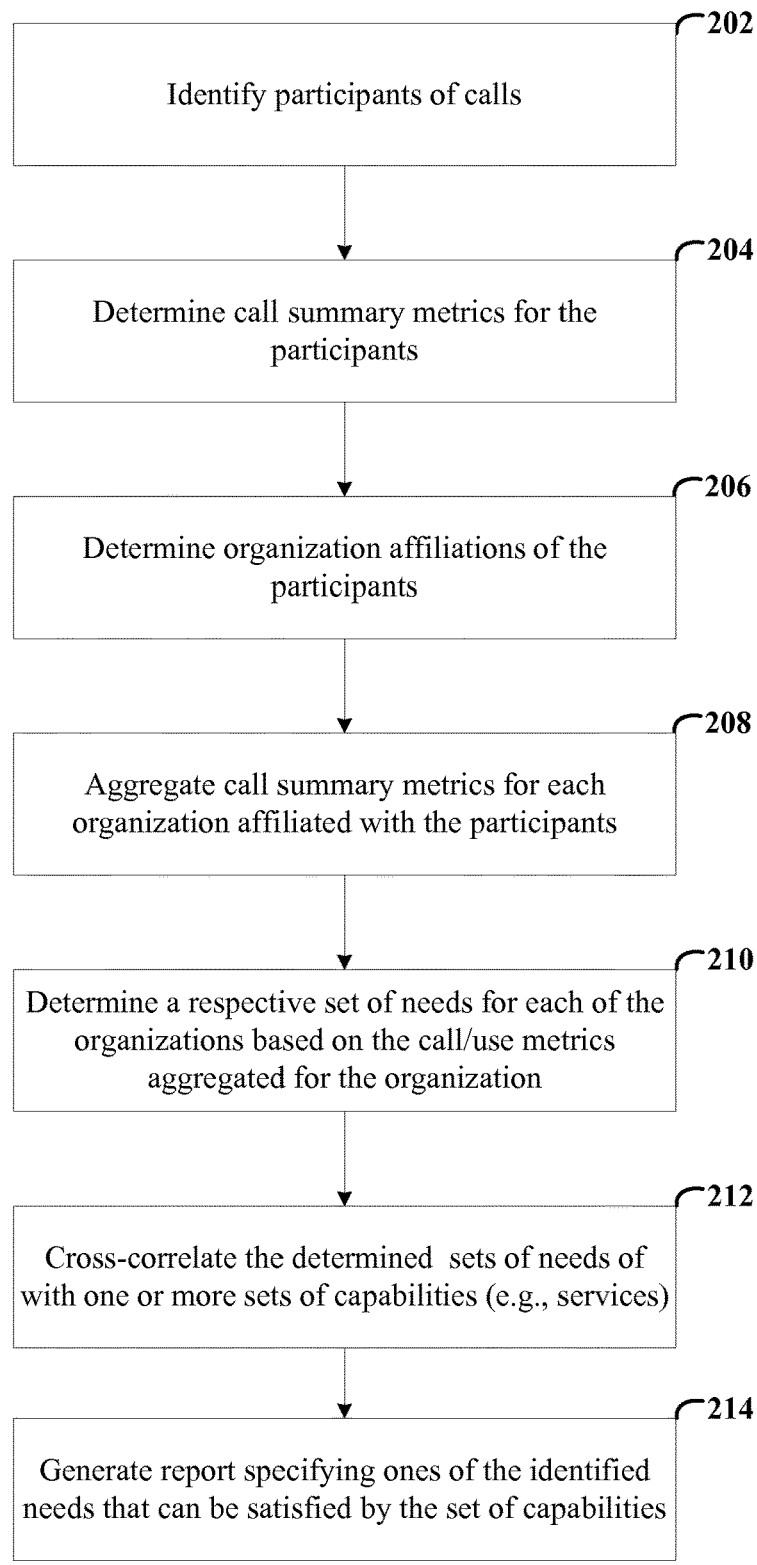
FIG. 2 shows an example process for analysis of call summary metrics, consistent with one or more embodiments of the present disclosure.

FIG. 2 shows an example process for analysis of call summary metrics, consistent with one or more embodiments. At block 202, participants of VoIP calls and/or users of services (e.g., virtual office services) are identified. At block 204, call and/or use metrics are determined. At block 206, organization affiliations of the participants/users are determined. At block 208, call/user metrics are aggregated for each of the organizations determined to be affiliated with the participants. As previously indicated, the call summary metrics may be aggregated for calls occurring over various time periods including, for example, second, minutes, hours, days, weeks, months, or years. At block 210, a respective set of needs is determined for each of the organizations based on the respective aggregated call summary metrics for the organization. As previously indicated, in some embodiments, needs may be determined as a function of the call summary metrics in combination with other data metrics derived from one or more secondary data sources. For example, needs may be determined based on call summary metrics for calls of end-users associated with an organization in combination with use of various online services by the end-users. At block 212, the determined sets of needs are cross-correlated with one or more sets of capabilities (e.g., available services). As previously described, a set of capabilities may include features of various services may be provided, for example, by another organization determined to be associated with participants of the VoIP calls, or by a VoIP service provider. At block 214, a report is generated that specifies ones of the identified need that can be satisfied by the set(s) of capabilities.

Figure 3:
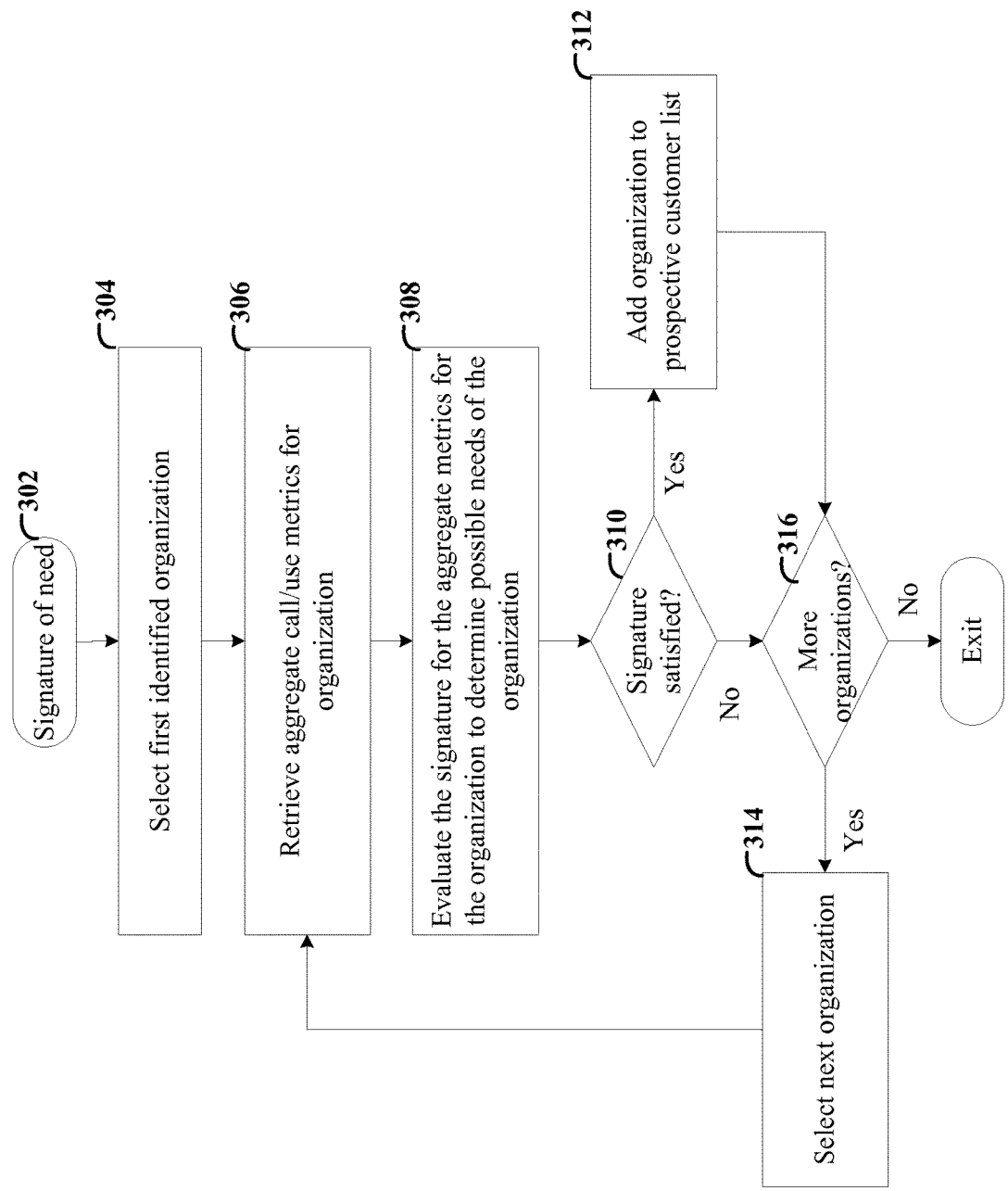
FIG. 3 shows an example process for identifying organizations having a particular product or service need, consistent with one or more embodiments of the present disclosure.

FIG. 3 shows an example process for identifying organizations having a need for one of more products or services. The process may be used, for example to, identify potential customers that may have a need for one or more products or services. In this example, organizations having a need for a particular product or service are identified using a signature 302 indicative of the need. A signature may specify, for example, a function of the call summary metrics that is indicates whether or not the need is present. At block 304, a first one of the identified organizations is selected. At block 306 a set of aggregate call/user metrics for the selected organization are retrieved. At block 308, the signature of the need is evaluated for the set of aggregate call/user metrics of the selected organization. If the signature is satisfied at decision block 310, the organization is added to a prospective customer list at block 312. Following block 312, or if the signature is not satisfied at decision block 310, the process proceeds to decision block 316. If there are additional organizations to be evaluated, at decision block 316, the next organization is selected at block 314 and the process is directed back to block 306. The process continues in this manner until there are no more organizations to be evaluated at decision block 316.

In this example, the signature 302 is described as indicating presence of a need as a function of the call summary metrics. However, as previously described, in some implementations, the signature 302 may indicating presence of a need as a function of various data metrics in addition to the call summary metrics. By cross correlating the call summary metrics with other data metrics, the identified list of potential customers 312 can be better refined. For example, identification of prospective customers based solely on call summary metrics may identify organizations that have already subscribed to the product or service corresponding to the need. In some implementations, the signature may be adapted to exclude organizations having the need if the organizations are included in a list of current customers.

In some embodiments, a signature may be manually specified by an authorized user based on apparent values correlated with a need for a service. As an illustrative example, a service may be provided for outsourcing operations of a call center. Call metrics indicating a significant number of unanswered calls for an organization may indicate that the organization may be in need of additional call center resources such as that provided by the service. With this in mind, a sales manager may manually define a signature that identifies organizations having more than a threshold number of unanswered calls as having a need for additional call center resources.

Figure 4:
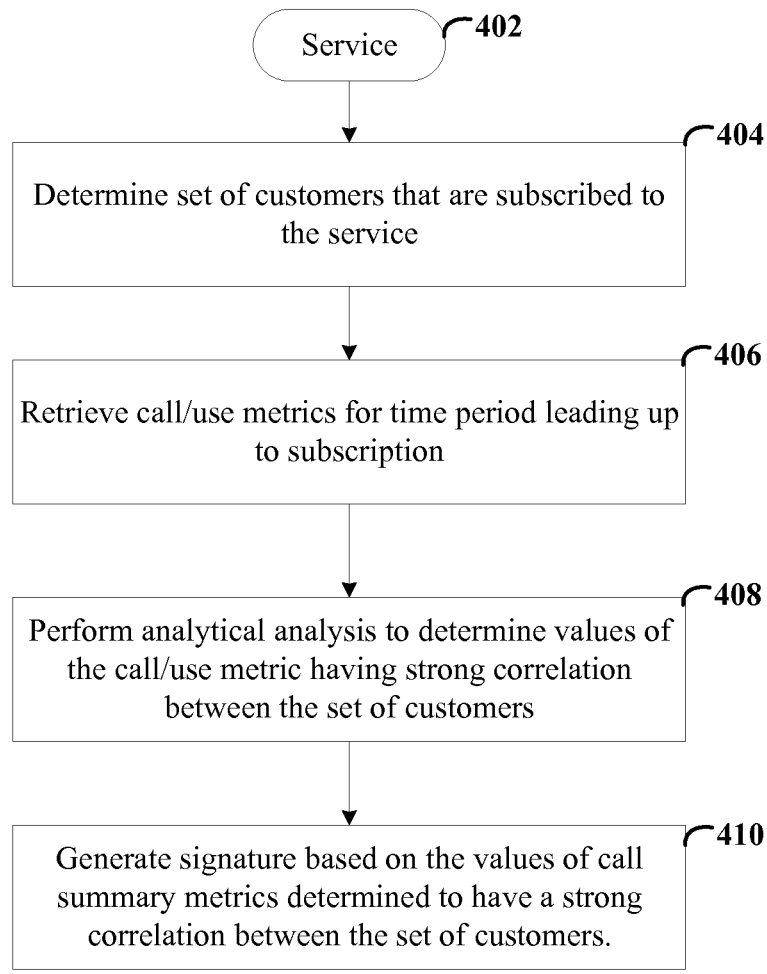
FIG. 4 shows an example process for determining a signature indicative of a need for a particular product or service, consistent with one or more embodiments of the present disclosure.

In some embodiments, a signature may be automatically determined based on an analysis of call summary metrics and/or other data metrics. FIG. 4 shows an example process for determining a signature indicative of a need for a particular product or service, consistent with one or more embodiments. At block 404, a set of customers that are subscribed to an identified service 402 are determined. At block 406, call/use metrics of the customers for a time period leading up to the subscription are retrieved. The length of the time period may be, for example, days, weeks, months, or years leading up to the subscriptions by one of the set of customers. At block 408, the retrieved call summary metrics are analyzed to determine values of the call/use metrics that have a strong correlation between the set of customers in the respective time periods leading up to the subscriptions. In some implementations, the analysis of the call summary metrics may give more weight to values of call summary metrics that are more recent. At block 410, the values of the call summary metrics determined to have a strong correlation to the need are used to generate a signature of the need. The automated generation of signatures may be useful to identify call summary metrics and/or other data metrics that are highly indicative of a need, but may not be readily apparent.

Figure 5:
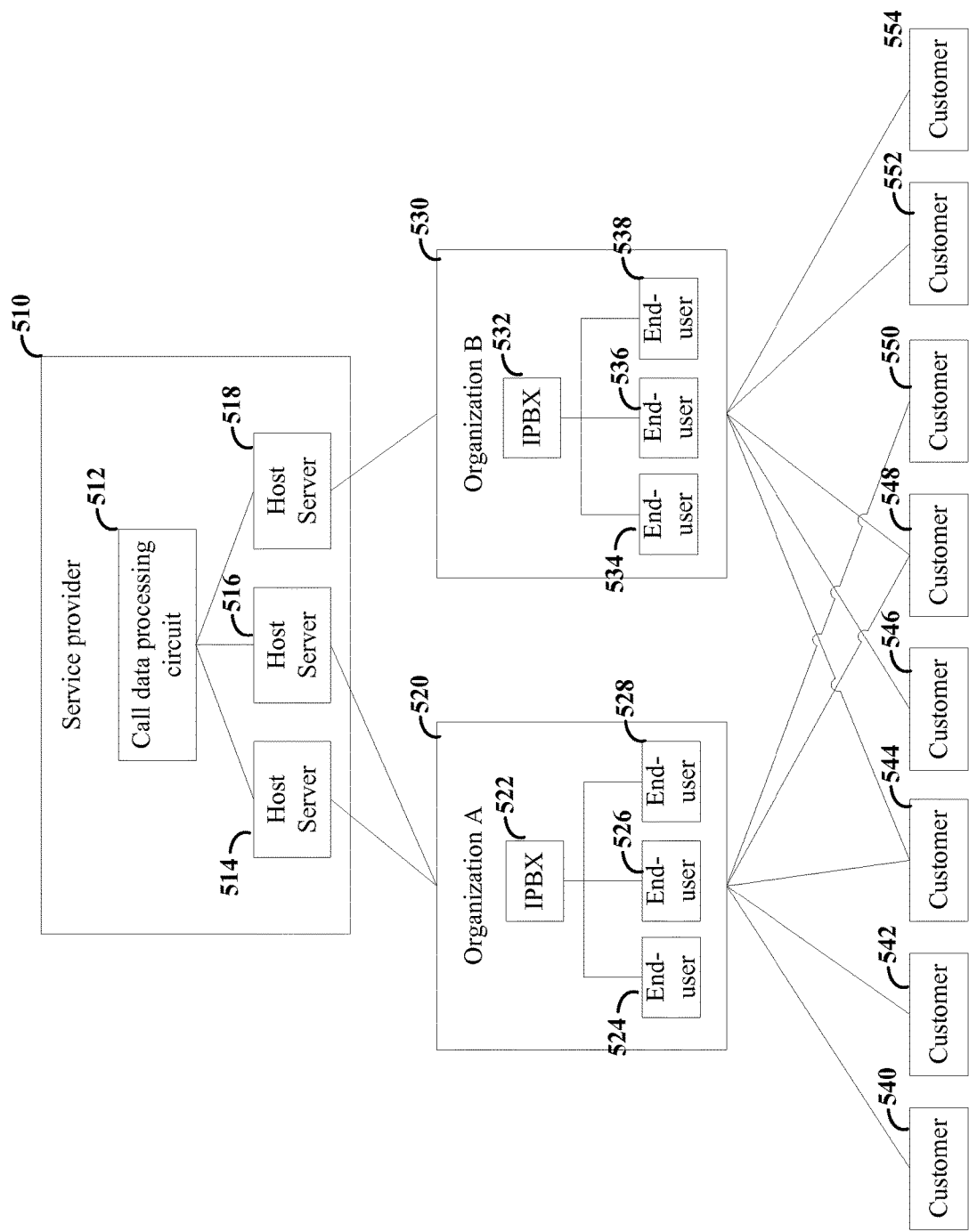
FIG. 5 shows an example hierarchy of a service provider, organizations, and customers, consistent with one or more embodiments of the present disclosure.

FIG. 5 shows an example hierarchy of a service provider, organizations, and customers, consistent with one or more embodiments. The organizations 520 and 530 provide respective products and/or services for various third-party customers 540, 542, 544, 546, 548, 550, 552, and 554. The service provider 510 includes a number of host servers 514, 516, and 518 configured to provide respective services for organizations 520 and 530. In this example, the host servers 514, 516, and 518 are configured to provide a respective IPBX 522 and 532 for each organization 520 and 530. The IPBXs 522 and 532 are configured to route calls for a plurality of end-users 524, 526, 528, 534, 536, and 538 connected to the IPBX. For instance, IPBXs 522 and 532 routes calls from between the end-users 524, 526, 528, 534, 536, and 538 and the third-party customers 540, 542, 544, 546, 548, 550, 552, and 554 of the organizations 520 and 530.

In addition to providing of IPBXs 522 and 532, the service provider 510 may provide one or more additional products or services to the organizations 520 and 530. For example, in some implementations, host servers 514, 516, and 518 may be configured to provide various services for the organizations 520 and 530 including, for example, file servers, email servers, web hosting, virtual meeting services (e.g., Voice-over-IP), billing, and/or remote computing services (e.g., virtual desktops, virtual private servers, and/or virtual enterprise services). For additional details regarding systems and method for providing computing services for a plurality of organizations, reference may be made to U.S. application Ser. No. 14/546,026, titled "VIRTUAL DATA CENTERS", which is fully incorporated by reference herein.

The service provider 510 also includes a call data processing circuit 512 configured to monitor the IPBXs 522 and 532 provided by the host servers 514, 516, and 518 for the organizations 520 and 530. As described with reference to the call data processing circuit 110 in FIG. 1, the call data processing circuit 512 is configured to generate call summary metrics in response to the call event messages generated by the IPBXs. The call data processing circuit 512 is further configured to identify organizations associated with call participants. The identified organizations include, for example, the organizations 520 and 530, which have the IPBXs 522 and 532 provided by service provider 510, or may be third party organizations, which include one or more of the third party customers 540, 542, 544, 546, 548, 550, 552, and 554.

The call data processing circuit 512 analyzes call summary metrics for calls of the organizations to identify needs of the identified organizations that can be satisfied by a set of capabilities. The set of capabilities include, for example, features of one or more products or services offered by the service provider 510 or the organizations 520. For instance, in some embodiments, the set of capabilities may be set to cause the call data processing circuit 512 to identify potential customers for products or services of the service provider 510, or one or more of the organizations 520 and 530, or third party companies.

Various blocks, modules or other circuits may be implemented to carry out one or more of the operations and activities described herein and/or shown in the figures. In these contexts, a "block" (also sometimes "logic circuitry" or "module") is a circuit that carries out one or more of these or related operations/activities (e.g., a call control circuit). For example, in certain ones of the above-discussed embodiments, one or more modules are discrete logic circuits or programmable logic circuits configured and arranged for implementing these operations/activities, as in the blocks shown in FIGS. 1 and 5. Similarly, it will be apparent that a server (e.g., providing a corresponding software platform), includes a computer processing circuit that is configured to provide services to other circuit-based devices. Moreover, a VoIP-enabled circuit device includes processing circuits that are configured to establish VoIP communication sessions with other devices (e.g., personal computers, IP-enabled mobile phones, and tablet computers). In certain embodiments, such a programmable circuit is one or more computer circuits programmed to execute a set (or sets) of instructions (and/or configuration data). The instructions (and/or configuration data) can be in the form of firmware or software stored in and accessible from a memory (circuit). As an example, first and second modules include a combination of a Central Processing Unit (CPU) hardware-based circuit and a set of instructions in the form of firmware, in which the first module includes a first CPU hardware circuit with one set of instructions and the second module includes a second CPU hardware circuit with another set of instructions. Certain embodiments are directed to a computer program product (e.g., nonvolatile memory device), which includes a machine or computer-readable medium having stored thereon, instructions which may be executed by a computer (or other electronic device) to perform these operations/activities.

Based upon the above discussion and illustrations, those skilled in the art will readily recognize that various modifications and changes may be made to the various embodiments without strictly following the exemplary embodiments and applications illustrated and described herein. For example, although aspects and features may in some cases be described in individual figures, it will be appreciated that features from one figure can be combined with features of another figure even though the combination is not explicitly shown or explicitly described as a combination. Such modifications do not depart from the true spirit and scope of various aspects of the invention, including aspects set forth in the claims.

What is claimed is:

1. An apparatus, comprising:
a first processing circuit communicatively coupled to an internet-protocol private branch exchange (IPBX) server configured and arranged to route Voice over Internet Protocol (VoIP) calls for a plurality of end-users having respective VoIP-enabled circuit devices communicatively coupled to the IPBX server via a communications network,
the first processing circuit configured and arranged to
receive call event messages indicative of changes in statuses of routed ones of the VoIP calls from the IPBX server,
generate call summary metrics for the calls routed by the IPBX server from the call event messages indicative of the changes in the statuses of routed ones of the VoIP calls, the call summary metrics indicating respective sets of call data for participants of the calls routed by the IPBX server; and
a second processing circuit communicatively coupled to the first processing circuit and configured and arranged to
identify companies or organizations within a company associated with the participants of the calls,
aggregate, for at least one of the identified companies or organizations within a company, call summary metrics of the participants associated with said at least one of the identified companies or organizations within a company to produce a respective aggregate set of data,
identify, based on the respective aggregate set of data, a plurality of needs of said at least one of the identified companies or organizations within a company that can be satisfied by a plurality of capabilities of a second one of the identified companies or organizations within a company, the plurality of needs corresponding to potential merchant offerings including a plurality of available products and/or services wherein the plurality of capabilities are correlated to one or more features of the plurality of available products and/or services; and
provide an indication of said at least one of the identified companies or organizations within a company and the plurality of needs to the second one of the identified companies or organizations within a company.

2. The apparatus of claim 1, wherein
the second processing circuit is further configured and arranged to
aggregate call summary metrics for the participants associated with the second one of the identified companies or organizations within a company to produce a respective aggregate set of data, and identify capabilities of the second one of the identified companies or organizations within a company, based on the respective aggregate set of data, to produce the plurality of capabilities.

3. The apparatus of claim 2, wherein the plurality of capabilities includes features of a service provided by the second one of the identified companies or organizations within a company and identifying the plurality of needs of the at least one organization includes comparing the aggregated call summary metrics to the features of the service.

4. The apparatus of claim 2, wherein the plurality of capabilities includes a list of defined features for a product in development and the needs identified are selected from the group consisting of: security monitoring tools, call center resources, bandwidth service, call attendant service, replacement product or services, virtual meeting service, and combinations thereof.

5. The apparatus of claim 1, wherein identifying the plurality of needs of the at least one organization that can be satisfied by the plurality of capabilities includes
identifying an initial set of needs of the at least one companies or organizations within a company based on the aggregate set of data;
cross-correlating the initial set of needs with a set of services; and
generating a report indicating ones of initial set of needs corresponding to the plurality of services.

6. The apparatus of claim 1, wherein the identifying of companies or organizations within a company associated with the participants of the calls by the second processing circuit includes, for each of a set of incoming calls to the IPBX, identifying an organization associated with a caller of the incoming call and wherein identifying the need is based on the call summary metrics and additional data metrics obtained from other sources.

7. The apparatus of claim 6, wherein the second processing circuit is configured and arranged to identify the companies or organizations within a company associated with the caller as a function of data indicated in a contact directory of the end-user that is called.

8. The apparatus of claim 6, wherein the second processing circuit is further configured and arranged to, for at least one of the set of incoming calls, determine a subject of the incoming call based on scheduling data of the end-user that is called.

9. The apparatus of claim 1, wherein the second processing circuit is further configured and arranged to
determine a function of the call summary metrics indicative of one of the plurality of needs; and
for each of the identified companies or organizations within a company, determine whether or not the companies or organizations within a company has the one of the needs by evaluating the function for the respective aggregate set of data.

10. The apparatus of claim 1, wherein the second processing circuit is configured and arranged to determine a function of the call summary metrics indicative of the one of the plurality of needs by
identifying a set of companies or organizations within a company previously determined to have the one of the needs, and
evaluating call summary metrics to identify commonalties among call summary metrics of the set of companies or organizations within a company.

11. The apparatus of claim 1, wherein the call summary metrics indicates for each of the call participants a number of incoming calls, a number of outgoing calls, a number of answered calls, a number of missed calls, a number of abandoned calls, average call time, average time to answer, average on-hold time, or combinations thereof.

12. The apparatus of claim 1, further comprising the IPBX server, and wherein identifying the plurality of needs further includes performing analytic operation using a machine learning function, and comparing the results to another machine learning function.

13. A method, comprising:
using an internet-protocol private branch exchange (IPBX) server,
routing Voice over Internet Protocol (VoIP) calls for a plurality of end-users having respective VoIP-enabled circuit devices communicatively coupled to the IPBX server via a communications network, and
providing call event messages indicating changes in statuses of the routed VoIP calls, to a first processing circuit communicatively coupled to the IPBX server;
using the first processing circuit, generating call summary metrics for the VoIP calls routed by the IPBX server based on the call event messages indicative of the changes in the statuses of the routed VoIP calls, the call summary metrics indicating respective sets of call data for participants of the calls routed by the IPBX server; and
using a second processing circuit communicatively coupled to the first processing circuit,
identifying companies or organizations within a company
associated with the participants of the calls,
aggregating, for at least one of the identified companies or organizations within a company, call summary metrics of the participants associated with the companies or organizations within a company to produce a respective aggregate set of data; and
identifying, based on the aggregate set of data, a set of needs of the companies or organizations within a company that can be satisfied by a set of capabilities of an a second one of the identified companies or organizations within a company, the set of needs including at least two needs and the set of capabilities including at least two capabilities, and wherein the plurality of capabilities are correlated to one or more features of the plurality of available products and/or services; and
providing an indication of the at least one companies or organizations within a company and the set of needs to the a second one of the identified companies or organizations within a company.

14. The method of claim 13, further comprising using the second processing circuit, for a second one of the identified companies or organizations within a company,
aggregating call summary metrics for the participants associated with the second one of the identified companies or organizations within a company to produce a respective aggregate set of data; and
identifying capabilities of the second one of the identified companies or organizations within a company, based on the aggregate set of data, to produce the set of capabilities by comparing the aggregate set of data to a signature that specifies a function of the call summary metrics that indicates whether or not the need is present.

15. The method of claim 14, wherein the set of capabilities includes at least two features of a service provided by the second one of the identified companies or organizations within a company that is not currently provided by the companies or organizations within a company.

16. The method of claim 14, wherein the set of capabilities includes a list of at least two defined features for a product in development.

17. The method of claim 13, wherein the identifying the set of needs of the at least one companies or organizations within a company that can be satisfied by the set of capabilities includes
identifying an initial set of needs of the at least one companies or organizations within a company based on the aggregate set of data,
cross-correlating the initial set of needs with the set of capabilities; and
generating a report indicating ones of initial set of needs corresponding to the set of capabilities.

18. The method of claim 13, wherein the identifying of companies or organizations within a company associated with the participants of the calls includes, for each of a set of incoming calls to the IPBX server, identifying an companies or organizations within a company associated with a caller of the incoming call.

19. The method of claim 18, wherein the identifying of the companies or organizations within a company associated with a caller of the incoming call is performed as a function of data indicated in a contact directory of the end-user that is called.

20. The method of claim 18, further comprising, for at least one of the set of incoming calls, determining a subject of the incoming call based on scheduling data of the end-user that is called.

* * * * *